(No Model.)
S. C. SCHOFIELD.
CURRY COMB.
No. 436,744. Patented Sept. 16, 1890.
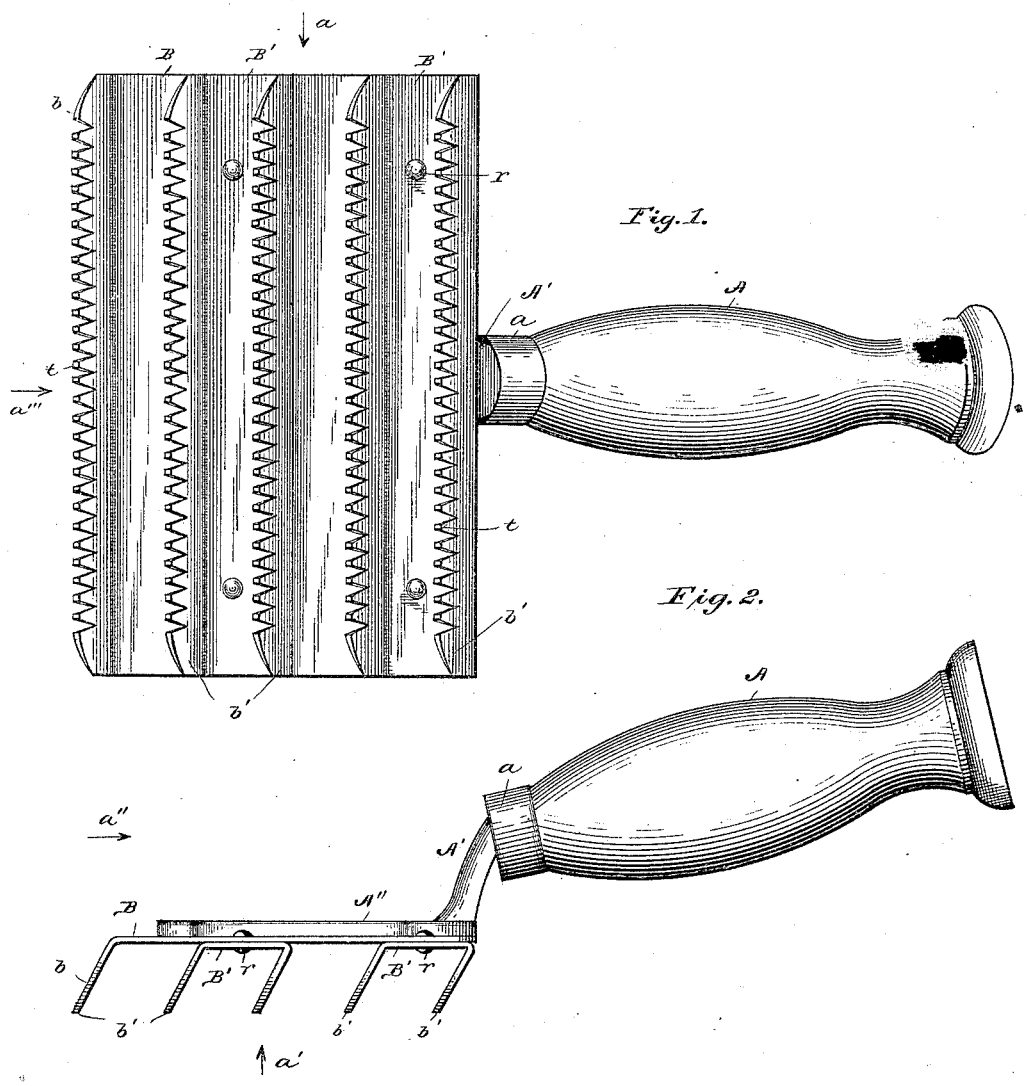

UNITED STATES PATENT OFFICE.

SILAS C. SCHOFIELD, OF FREEPORT, ILLINOIS, ASSIGNOR TO LEVI M. DEVORE, OF SAME PLACE.

CURRY-COMB.

SPECIFICATION forming part of Letters Patent No. 436,744, dated September 16, 1890.

Application filed May 27, 1890. Serial No. 353,347. (No model.)

*To all whom it may concern:*

Be it known that I, SILAS C. SCHOFIELD, a resident of Freeport, in the county of Stephenson and State of Illinois, have invented certain new and useful Improvements in Curry-Combs; and I do hereby declare the following to be a full, clear, and exact description of the invention, such as will enable others skilled in the art to which it pertains to make and use the same.

My invention relates to improvements in curry-combs, and is fully described and explained in this specification and shown in the accompanying drawings, in which—

Figure 1 is a plan of the working-face of a curry-comb embodying my invention, the view being in the direction indicated by the arrow $a'$ in Fig. 2. Fig. 2 is a side elevation of the same comb, the view being in the direction indicated by the arrow $a$ in Fig. 1.

In the figures, A is a suitable handle, A' a curved metal shank set in the handle, and A'' a bracket integral with the free end of the shank.

B is a plate of preferably wrought metal rigidly fastened to the bracket A'', the edge of the plate farthest from the handle and approximately at right angles thereto being preferably bent downward to form a comb section $b$, having teeth $t$. A series of plates B' are riveted to the back plate B, in lines approximately at right angles to the line of the handle, and each of these plates has both its edges bent downward to form comb-sections $b'$ parallel to the section $b$, and like it provided with teeth $t$, formed on their edges. All of the tooth-sections $b\ b'$ are in planes approximately parallel to each other and oblique with reference to the back plate B, the toothed free edges of said sections being inclined away from the handle, in the manner clearly shown in the drawings. This feature of construction of the comb renders its operation and effect wholly different from that of the ordinary comb, in which the comb-sections are at right angles to the back on which they are formed. It is evident that if the comb when in use be drawn in the direction indicated by the arrows $a''$, Fig. 2, and $a'''$, Fig. 1, it can be moved very easily, and will leave the coat of the animal smoother than if the comb-sections were at right angles to the back plate and to the surface operated upon; and, on the other hand, when the coat of the animal is extremely dirty and requires particularly effective use of the comb, the movement of the comb in the opposite direction brings the teeth in close contact with the hide and cleans it with great rapidity.

I have found in practical use of the comb that under all ordinary circumstances, and in nearly all cases, the comb need only be drawn in the direction indicated by the arrows $a''\ a'''$, and that when so used it thoroughly cleans the animal's coat with the least possible irritation of the hide, and leaves it smoother and in much better condition than if its sections were in the ordinary position.

A very important advantage results from the construction above described, as a comb having its toothed sections oblique may be much more readily cleaned than if the sections be at right angles to the plane of the back. If the comb, when clogged in use, be drawn across the brush in the direction indicated by the arrows $a''\ a'''$, but very few strokes suffice to clean it perfectly, and the fact that it may be so readily cleaned and kept in working order adds very greatly to its efficiency and practical value.

Having now described and explained my invention, what I claim as new, and desire to secure by Letters Patent, is—

1. In a curry-comb, the combination, with a rigid back, of a series of rigid parallel toothed sections fastened to the back and lying in planes oblique and inclined in the same direction with reference thereto, substantially as and for the purpose set forth.

2. In a curry-comb, the combination, with a suitable back and the handle attached thereto, of a series of toothed sections fastened to the back and oblique with reference thereto, the toothed edges of said sections being inclined away from the handle, substantially as and for the purpose set forth.

In testimony whereof I have signed this specification in the presence of two subscribing witnesses.

SILAS C. SCHOFIELD.

Witnesses:
R. H. WILES,
J. A. CRAIN.